United States Patent
Venkataramanan et al.

(10) Patent No.: US 9,170,638 B2
(45) Date of Patent: Oct. 27, 2015

(54) METHOD AND APPARATUS FOR PROVIDING EARLY BYPASS DETECTION TO REDUCE POWER CONSUMPTION WHILE READING REGISTER FILES OF A PROCESSOR

(75) Inventors: Ganesh Venkataramanan, Sunnyvale, CA (US); Emil Talpes, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 858 days.

(21) Appl. No.: 12/969,825

(22) Filed: Dec. 16, 2010

(65) Prior Publication Data
US 2012/0159217 A1    Jun. 21, 2012

(51) Int. Cl.
*G06F 9/30* (2006.01)
*G06F 1/32* (2006.01)
*G06F 9/38* (2006.01)

(52) U.S. Cl.
CPC ............ *G06F 1/3243* (2013.01); *G06F 1/3203* (2013.01); *G06F 9/3828* (2013.01); *G06F 9/3836* (2013.01); *G06F 9/3889* (2013.01); *Y02B 60/1239* (2013.01)

(58) Field of Classification Search
CPC .... G06F 1/3243; G06F 1/3203; G06F 9/3828; G06F 9/3836; G06F 9/3889; Y02B 60/1239
See application file for complete search history.

(56) References Cited

U.S. PATENT DOCUMENTS

| | | | | |
|---|---|---|---|---|
| 6,000,016 A  * | 12/1999 | Curtis et al. | ................... | 711/138 |
| 7,263,577 B2 * | 8/2007 | Bridges et al. | ................. | 711/108 |
| 2004/0064677 A1* | 4/2004 | Morris | .......................... | 712/210 |
| 2004/0128574 A1* | 7/2004 | Ricci et al. | ..................... | 713/320 |
| 2005/0027967 A1* | 2/2005 | Sperber et al. | ................. | 712/216 |
| 2007/0106885 A1* | 5/2007 | Rychlik | ......................... | 712/228 |
| 2008/0263321 A1* | 10/2008 | Le et al. | .......................... | 712/32 |

* cited by examiner

*Primary Examiner* — Fahmida Rahman
(74) *Attorney, Agent, or Firm* — Volpe and Koenig, P.C.

(57) ABSTRACT

A method and apparatus are described for reducing power consumption in a processor. A micro-operation is selected for execution, and a destination physical register tag of the selected micro-operation is compared to a plurality of source physical register tags of micro-operations dependent upon the selected micro-operation. If there is a match between the destination physical register tag and one of the source physical register tags, a corresponding physical register file (PRF) read operation is disabled. The comparison may be performed by a wakeup content-addressable memory (CAM) of a scheduler. The wakeup CAM may send a read control signal to the PRF to disable the read operation. Disabling the corresponding PRF read operation may include shutting off power in the PRF and related logic.

21 Claims, 9 Drawing Sheets

METHOD AND APPARATUS FOR PROVIDING EARLY BYPASS DETECTION TO REDUCE POWER CONSUMPTION WHILE READING REGISTER FILES OF A PROCESSOR

FIELD OF INVENTION

This application is related to the design of a processor.

BACKGROUND

Dedicated pipeline queues have been used in multi-pipeline execution units of processors, (e.g., central processing units (CPUs), graphics processing units (GPUs), and the like), in order to achieve faster processing speeds. In particular, dedicated queues have been used for execution (EX) units having multiple EX pipelines that are configured to execute different subsets of a set of supported micro-operations, (i.e., micro-instructions). Dedicated queuing has generated various bottlenecking problems and problems for the scheduling of micro-operations that required both numeric manipulation and retrieval/storage of data.

Additionally, processors are conventionally designed to process operations that are typically identified by operation (Op) codes (OpCodes), (i.e., instruction codes). In the design of new processors, it is important to be able to process all of a standard set of operations so that existing computer programs based on the standardized codes will operate without the need for translating operations into an entirely new code base. Processor designs may further incorporate the ability to process new operations, but backwards compatibility to older operation sets is often desirable.

Operations (Ops) represent the actual work to be performed. Operations represent the issuing of operands to implicit (such as add) or explicit (such as divide) functional units. Operations may be moved around by a scheduler queue.

Operands are the arguments to operations, (i.e., instructions). Operands may include expressions, registers or constants.

Execution of micro-operations (uOps) is typically performed in an execution unit of a processor core. To increase speed, multi-core processors have been developed. To facilitate faster execution throughput, "pipeline" execution of operations within an execution unit of a processor core is used. Cores having multiple execution units for multi-thread processing are also being developed. However, there is a continuing demand for faster throughput for processors.

One type of standardized set of operations is the operation set compatible with "x86" chips, (e.g., 8086, 286, 386, and the like), that have enjoyed widespread use in many personal computers. The micro-operation sets, such as the x86 operation set, include operations requiring numeric manipulation, operations requiring retrieval and/or storage of data, and operations that require both numeric manipulation and retrieval/storage of data. To execute such operations, execution units within processor cores have included two types of pipelines: arithmetic logic pipelines ("EX pipelines") to execute numeric manipulations and address generation (AG) pipelines ("AG pipelines") to facilitate load and store operations.

In order to quickly and efficiently process operations as required by a particular computer program, the program commands are decoded into operations within the supported set of micro-operations and dispatched to the execution unit for processing. Conventionally, an OpCode is dispatched that specifies what operation/micro-operation is to be performed, along with associated information that may include items such as an address of data to be used for the operation and operand designations.

Dispatched operations (uOps) are conventionally queued for a multi-pipeline scheduler of an execution unit. Queuing is conventionally performed with some type of decoding of a micro-operation's OpCode in order for the scheduler to appropriately direct the operations for execution by the pipelines with which it is associated within the execution unit.

FIG. 1 shows a block diagram of an example conventional processor core 10 of a multi-core integrated circuit (IC). The processor core 10 includes a decoder unit 15 that decodes and dispatches micro-operations to a fixed point execution unit 20. Multiple fixed point execution units may be provided for multi-thread operation. Optionally, a second fixed point execution unit (not shown) may be provided for dual thread processing.

The conventional processor core 10 further includes a floating point unit 25 for execution of floating point operations. Preferably, the decoder unit 15 dispatches operations in information packets over a common bus to both the fixed point execution unit 20 and the floating point unit 25.

The fixed point execution unit 20 includes a mapper 30 associated with a scheduler queue 35 and a picker 40. These components control the selective distribution of operations among a plurality of arithmetic logic (EX) pipelines 45 and address generation (AG) pipelines 50. The pipelines 45 and 50 execute operations queued in the scheduler queue 35 by the mapper 30 that are picked therefrom by the picker 40 and directed to an appropriate pipeline 45 or 50. In executing a micro-operation, the pipelines 45 and 50 identify the specific kind of operation to be performed by a respective operation code (OpCode) assigned to that kind of micro-operation.

In the example shown in FIG. 1, the fixed point execution unit 20 includes four pipelines, (two address generation pipelines and two arithmetic pipelines), for executing queued operations. A first arithmetic logic pipeline $45_1$ (EX0) and a first address generation pipeline $50_1$ (AG0) are associated with a first set $55_1$ of physical registers in which data is stored relating to execution of specific operations by the two pipelines $45_1$ and $50_1$. A second arithmetic logic pipeline $45_2$ (EX1) and a second address generation pipeline $50_2$ (AG1) are associated with a second set $55_2$ of physical registers in which data is stored relating to execution of specific operations by those two pipelines $45_2$ and $50_2$. Preferably, there are 96 physical registers in each of the first and second sets of registers $55_1$ and $55_2$.

In the example fixed point execution unit 20 shown in FIG. 1, the arithmetic logic pipelines 45 (EX0, EX1) have asymmetric configurations. The first arithmetic pipeline $45_1$ (EX0) is preferably the only pipeline configured to process divide (DIV) operations 60 and count leading zero (CLZ) operations 65 within the fixed point execution unit 20. The second arithmetic pipeline $45_2$ (EX1) is preferably the only pipeline configured to process multiplication (MULT) operations 70 and branch operations 75 within the fixed point execution unit 20.

DIV and MULT operations generally require multiple clock cycles to execute. The complexity of both arithmetic pipelines 45 is reduced by not requiring either arithmetic pipeline 45 to perform all possible arithmetic operations, and instead dedicating multi-cycle arithmetic operations for execution by only one of the two arithmetic pipelines. This saves chip real estate while still permitting a substantial overlap in the sets of operations that can be executed by the respective arithmetic pipelines EX0, EX1.

The processing speed of the fixed point execution unit 20 may be affected by the operation of any of the components.

Since all of the micro-operations that are processed must be mapped by the mapper 30 into the scheduler queue 35, any delay in the mapping/queuing process can adversely affect the overall speed of the execution unit.

There are three kinds of operations requiring retrieval and/or storage of data, namely, load (LD), store (ST) and load/store (LD/ST). These operations are performed by the address generation pipelines 50 (AG0, AG1) in connection with a load/store unit 80 of the fixed point execution unit 20.

FIG. 2A shows a plurality of queue positions QP1 ... QPn in the scheduler queue 35. Generally, it is preferable to have at least five times as many queue positions as there are pipelines to prevent bottlenecking of the unified scheduler queue 35. However, when a unified queue that services multiple pipelines has too many queue positions, scanning operations may become time prohibitive and impair the speed in which the scheduler queue 35 operates. The scheduler queue 35 is sized such that queued operations for each of the four pipelines can be picked and directed to the respective pipeline for execution in a single cycle. The full affect of the speed of the scheduler queue 35 directing the execution of queued operations may be realized because there is no impediment in having operations queued into the scheduler queue 35 due to the mapper's speed in queuing operations based on operation types (OpTypes).

Referring back to FIG. 1, the mapper 30 is configured to queue a micro-operation (uOp) into an open queue position based on the micro-operation's information packet received from the decoder 15. The mapper 30 may be configured to receive two operation information packets in parallel, which the mapper 30 preferably queues in a single clock cycle. The decoder 15 may be configured to dispatch four operation information packets in parallel.

The floating point unit 25 scans the OpType of all four packets dispatched in a given clock cycle. Any floating point operation components indicated by the scan of the OpType fields data of the four packets are then queued and executed in the floating point unit 25.

The mapper 30 may be configured to make a top to bottom scan and a bottom to top scan in parallel of the queue positions QP1-QPn to identify a topmost open queue position and bottom most open queue position; one for each of the two micro-operations corresponding to two packets received in a given clock cycle.

Where the OpType field data of a dispatched packet indicates OpType FP, the micro-operation corresponding to that packet is not queued because it only requires execution by the floating point unit 25. Accordingly, even when two operation information packets are received from the decoder 15 in one clock cycle, one or both micro-operations may not be queued in the scheduler queue 35 for this reason.

One of the primary goals for the scheduler queue 35 is try to pick operations from a pool of Ops in their age order. Once a plurality of Ops are stored in the scheduler queue 35, it is desirable to pick those entries that are ready to be executed in the order in which they arrived in the scheduler queue 35 to provide the best possible scheduling of the Ops. However, in order to do that traditionally, the entries in the queue are always maintained in age order. Thus, the top entry is the oldest, and the bottom entry is the newest, and a significant amount of logic and power is required to maintain the scheduler queue 35 in this manner.

As shown in FIG. 2A, each queue position QP1 ... QPn is associated with memory fields for an arithmetic logic operation (ALU payload) 45, an address generation operation (AG payload) 50, four wakeup content-addressable memories (CAMs) 205, 210, 215 and 220 (sources A-D) that identify addresses of physical registers that contain source data for the operation, and a destination CAM 225 (destination) that identifies a physical register where the data resulting from the execution of the micro-operation is to be stored.

A separate data field 230 (immediate/displacement) is provided for accompanying data that an operation is to use. Such data is sent by the decoder 15 in the dispatched packet for that operation. For example, a load operation Ld is indicated in queue position QP1 that seeks to have the data stored at the address 6F3D indicated in the immediate/displacement data field into the physical register identified as P5. In this case, the address 6F3D was data contained in the operation's information packet dispatched from the decoder unit 12, which information was transferred to the immediate/displacement data field $230_1$ for queue position QP1 in connection with queuing that operation to queue position QP1.

The ALU payload fields 235 and the AG payload fields 240 are configured to contain the specific identity of an operation as indicated by the operation's OpCode, along with relative address indications of the operation's required sources and destinations that are derived from the corresponding dispatched data packet. In connection with queuing, the mapper 30 translates relative source and destination addresses received in the operation's information packet into addresses of physical registers associated with the pipelines 45 and 50 of FIG. 1.

The mapper 30 tracks relative source and destination address data received in the operation information packets so that it can assign the same physical register address to a respective source or destination where two operations reference the same relative address. For example, P5 is indicated as one of the source operands in the ADD operation queued in queue position QP2, and P5 is also identified as the destination address of the result of the Ld operation queued in queue position QP1. This indicates that the dispatched packet for the Ld operation indicated the same relative address for the destination of the Ld operation as the dispatched packet for the ADD operation had indicated for one of the ADD source operands.

Referring to both FIGS. 1 and 2A, flags are provided in the scheduler queue 35 to indicate eligibility for picking the operation for execution in the respective pipelines 45 and 50 (EX0, EX1, AG0, and AG1). The picker 40 preferably includes an individual picker for each of the ALU pipelines 45 (EX0, EX1) and the AG pipelines 50 (AG0, AG1). Each respective pipeline's picker scans the respective pipeline picker flags of the queue positions to find queued operations that are eligible for picking. Upon finding an eligible queued operation, the picker checks to see if the operation is ready to be picked. If it is not ready, the picker resumes its scan for an eligible operation that is ready to be picked. Preferably, the EX0 and AG0 pickers scan the flags from the top queue position QP1 to the bottom queue position QPn, and the EX1 and AG1 pickers scan the flags from the bottom queue position QPn to the top queue position QP1 during each cycle. A picker will stop its scan when it finds an eligible operation that is ready and then direct that operation to its respective pipeline for execution. Preferably this occurs in a single clock cycle.

Readiness for picking is indicated by the source wakeup CAMs for the particular operation component being awake indicating a ready state. When there is no wakeup CAM being utilized for a particular operation component, the operation is automatically ready for picking. For example, the Ld operation queued in queue position QP1 does not utilize any source CAMs so that it is automatically ready for picking by either of the AG0 or AG1 pickers upon queuing. In contrast, the ADD operation queued in queue position QP2 uses the queue position's wakeup CAMs sources A and B. Accordingly, that ADD operation is not ready to be picked until the physical registers P1 and P5 have been indicated as ready by queue position QP2's wakeup CAMs source A and source B being awake.

Where one of the arithmetic pipelines is performing a multi-cycle operation, the pipeline preferably provides its associated picker with an operation to suspend picking operations until the arithmetic pipeline completes execution of that multi-cycle operation. In contrast, the address generation pipelines are preferably configured to commence execution of a new address generation operation without awaiting the retrieval of load data for a prior operation. Accordingly, the pickers will generally attempt to pick an address generation operation for each of the address generation pipelines AG0, AG1 for each clock cycle when there are available address generation operations that are indicated as ready to pick.

In some cases, the CAMs may awake before the required data is actually stored in the designated physical register. Typically, when a load operation is executed where a particular physical register is indicated as the load destination, that physical register address is broadcast after four cycles to the wakeup CAMs in order to wake up all of the CAMs designated with the physical register's address. Four cycles is a preferred nominal time it takes to complete a load operation. However, it may take much longer if the data is to be retrieved by the load/store unit 80 from a remote location. Where an operation is picked before the physical register actually contains the required data, the execution unit is preferably configured to replay the affected operations which are retained in their queue positions until successful completion.

The picker 40 is responsible for issuing operations (Ops) that are ready for execution based on various constraints. The picker 40 receives a dependency relationship for a maximum of four (4) complex operations (COps) per cycle. Information on each COp is stored in a scheduler queue entry which is scheduled by scheduler queue identity (QID). A maximum of four (4) sources per COp may be supported in the scheduler queue 35. COps have memory and/or register operands which are broken up into two (2) simple micro-operations (uOps): one that performs an address generation operation (AgOp) and one that performs an execute operation (ExOp). The COps are then renamed and sources are assigned. Renaming, (i.e., register renaming) is performed prior to writing a COp in the scheduler queue 35 by the mapper 30, whereby external operand names (architecture register names (ARNs)) specified by the COp are translated into internal operand names (i.e., physical register names (PRNs)).

For example, an x86 program may include an operation set that encodes an addition COp "ADD RAX, RBX" followed by a subtraction COp "SUB RCX, RAX". RAX, RBX and RCX are ARNs specified by the x86 architecture. Since they do not have a one-to-one correspondence to internal machine registers, they may be associated to different PRNs. Thus, a renaming process is performed to map the external names to internal names.

FIG. 2B shows the logical organization of a conventional picker 250 configured to handle 48 entries. The picker 250 includes a wakeup dependency array 255, post-wake request logic 260 and pickers 265.

The wakeup dependency array 255 stores dependency information in the form of PRN tags. The wakeup dependency array 255 tracks dependencies of COps and uOps by monitoring four tag broadcast busses: two for an address generator (AG) and two for an execution (EX) unit. The wakeup dependency array 255 marks the readiness by a match bit for each of the COp sources. The output of wakeup dependency array 255 may appear as a four-bit match signal which is 48 entries deep. This is analogous to a 48-entry (0-47) four-bit ready vector 270.

The post-wake request logic 260 is responsible for generating a 48-entry (0-47) four-bit request vector 275 from the ready vector 270 output by the wakeup dependency array 255. The request vectors 275 are based on the Op type and other scheduling constraints associated with the EX pipelines 45 (EX0 and EX1) and the AG pipelines 50 (AG0 and AG1) shown in FIG. 1. Dependency information 280 is input into each of the wakeup dependency array 255 and the post-wake request logic 260.

The pickers 265 perform priority selects. Four pickers, (one for each of the EX pipelines 45 (EX0 and EX1) and the AG pipelines 50 (AG0 and AG1) shown in FIG. 1), take the request vectors as their inputs and select one of the requests based on a set priority direction. This select logic has additional age priority information to prioritize older Ops.

The goal of this "wakeup" process is to detect the moment when all of the operands of a COp have been produced, and thus the COp may be executed. A "tag" associated with each of the four COp sources (CAMs) is compared against the broadcasted tags; (i.e., tags associated with the results generated by the processor). When each of these comparisons results in detecting tag equality, this indicates that the corresponding operand has become available and a "match" bit is set. When the "match" bits for all four sources are set, the COp may be issued for execution.

FIG. 3A shows a conventional processor pipeline 300 including a renamer unit (Map) 305, a scheduler (SC) 310, a physical register file (PRF) 315, an execution unit (EX) 320 and a write back unit (WB) 325. The renamer unit 305 performs register renaming. The scheduler 310 has a configuration similar to the picker 250 of FIG. 2B. The PRF 315 is a memory array of registers that stores operand data. The data stored in the PRF 315 is indicated by a PRN index. The PRF 315 performs the operands read for all COps that are issued for execution by the execution unit 320. The write back unit 325 writes the results.

FIG. 3B shows an example of using the processor pipeline 300 of FIG. 3A. All uOps are fed through the MAP 305 and SC 310, but not necessarily at the same time. When a first single cycle uOp, uOp1, travels through the processor pipeline 300, it goes through a variety of dual-phase cycles which describe a temporal ordering of events. The uOp1 is received during a Map A cycle phase 330 of the Map 305, and the dependency information for uOp1 is written into the wakeup dependency array of a picker during a Map B cycle phase 332 of the Map 305. While in the SC 310, a "wakeup" process is performed during a cycle phase 334 whereby a tag associated with the uOp1 is distributed (i.e., compared against a plurality of broadcasted tags). When each of these comparisons results in detecting tag equality, this indicates that a corresponding operand has become available and a "match" bit is set to indicate that the uOp1 is ready for execution. In cycle phase 336 of the SC 310, a ready uOp is selected (i.e., picked) for each of four execution pipes. In cycle phase 338 of the PRF 315, a uOp lookup in payload is performed to perform a "payload read"; (i.e., read various information from a payload array for each of the four selected uOps). In cycle phase 340 of the PRF 315, the selected uOp travels to the EX 320. In phase cycle 342 of the EX 320, data associated with the uOp is read from the PRF 315; (i.e., to get register operands). In phase cycle 344 of the EX 320, the single cycle uOp is executed. In phase cycle 346 of the WB 325, the uOps are written back to the PRF 315.

Still referring to FIG. 3B, as a second uOp, uOp2, travels through the processor pipeline 300, it goes through a variety of cycles including a Map A cycle phase 348 while in the Map 305, a dependent wakeup cycle phase 350 and a pick cycle phase 352 while in the PRF 315, a lookup cycle phase 354 and a transport cycle phase 356 while in the EX 320, and a PRF cycle phase 358 and an execute cycle phase 360 while in the WB 325.

Referring to FIGS. 2B, 3A and 3B, in a wakeup phase of cycle 'n', the destination PRN-tags for uOps that are going to generate their results in cycle n+2 are distributed in the wakeup dependency array 255. These PRN tags are compared to all of the source tag fields in the scheduler 310. The sources that match on the distributed PRN-tags on any of the 4 tag distribution buses, assert their match status. Once a source asserts a match with destination tags, logic in post-wake ensures marking the source as 'previously matched', thus generating a sticky ready for that uOp. The post-wake request logic 260 accumulates the ready states for each of the 4 possible sources of a uOp and generates requests for the pickers in early phase B of the cycle for the SC 310. The post-wake request logic 260 also uses resource conflict information from pipe-control to establish eligibility of a uOp to request. Each of the 4 pickers selects a uOp based on age information whenever possible. If uOps from the oldest pool of uOps are ready, the picker selects those uOps or else it selects from the random requests from post-wake.

A single cycle wakeup-pick loop is essential to ensure best latency results by using the bypass path for operands that are outputs from single cycle uOps. As shown in FIG. 3B, the wakeup of dependent uOps in cycle phase 338 needs to occur two full cycles before the result bus output from the parent uOp occurs in the cycle phase 358 of the WB 325 in order to use the bypass path.

After the status of the EX Op is determined to be good, the pipe-control determines if the COp can be de-allocated from the scheduler queue. A maximum of 4 queue entries may be de-allocated every cycle, and pipe control logic is responsible for determining entries to be deallocated. For uOps that have load data as their source operands, the status of the uOp is only determined a cycle after the actual execution of the uOp. If the status is bad, the uOps that are speculatively woken up may or may not get issued, depending on the picker bandwith. Ultimately, the load that failed returns good data and all the dependent uOps are either woken up and start re-requesting a pick if they already are issued, or retain their requests to get picked.

FIG. 3C shows additional details of the conventional processor pipeline 300, whereby the scheduler 310 outputs uOps to each of the PRF 315 and a bypass controller 365. FIG. 3C further shows a bypass multiplexer (MUX) 370 including a plurality of OR gates 372 and an AND gate 374. The bypass MUX 370 receives bypass signals 376 from the bypass controller 365, data inputs 378 from the address generation pipelines AG0 and AG1, and the arithmetic logic pipelines EX0 and EX1, as well as data input 380 from the PRF 315. Each of the respective bypass signals 376 are OR'd with respective data inputs 378 or 380. The outputs 382 of the OR gates 372 are combined by the AND gate 374, which sends its output 384 to the execution unit 320.

The bypass controller 365 receives an input from the scheduler 310, which represents uOp sources and destinations. The bypass controller 365 compares the destination PRNs of uOps executed in cycle N against the source PRNs of uOps executed in cycle N+1. If one of the source PRNs needed in cycle N+1 matches any of the destination PRNs produced in the previous cycle, the corresponding source data will be taken from the data bypass input 376 corresponding to that destination. All of these PRNs, (together with some information about the operation types and restrictions), are retrieved from the scheduler 310.

The data inputs 378 are the data bypass legs associated with the destination PRNs from the previous cycle. They originate from the four (4) execution pipes (AG0, AG1, EX0, EX1). For example, if a sequence of 2 uOps, (uOp1 and uOp2 as shown in FIG. 3B), are being executed, and source A of uOp2 is the same as the destination of uOp1, and uOp1 executes in pipe EX0, the data for source A of uOp2 will come from the bypass leg associated with the execution pipe EX0, (the one which produces the result for uOp1). The bypass controller 365 must detect this and turn on the corresponding bypass leg (e.g., in FIG. 3C, this corresponds with a 0 value on leg $376_2$).

FIG. 4 shows a conventional PRF read operation and PRF read bypass operation. A PRF read operation is initiated following the issue of a uOp by the scheduler 510 310. This issue results in a read of a payload register file in order to retrieve source physical register tags which form PRF read addresses, and destination physical register tags which form PRF write addresses. The payload read occurs in a pipe stage register file (RF) during an A-phase of the PRF 315 (see uOp Lookup 338 in FIG. 3B). Payload data is distributed to a pipe control block, which checks source tags of the newly issued uOp (uOp2) against destination tags of the uOp currently being executed in the register file stage (uOp1). If the tags match, then the uOp is provided through the bypass network and the PRF read is suppressed. Otherwise, the PRF read is performed and source uOps are delivered for execution during the B-phase of the EX 320.

FIG. 4 shows that bypass control logic 405 receives PRNs from a payload read 410 of uOp1, and a payload read 415 of uOp2. A destination PRN 420 from uOp1 is compared to each of the source PRNs 425 of uOp2. Selects 430 are generated by the bypass control logic 405, (e.g., see data bypass inputs 376 in FIG. 3C), and are sent to a bypass MUX 435. The execution 440 of uOp1 generates results 445. If a source PRN of uOp2 is different than a destination PRN of uOp1, then data read out of the PRF (PRF read 450) is used. If a source PRN of uOp2 is the same as a destination PRN of uOp1, the data read out of the PRF (PRF read 450) is discarded and the results 445 are used instead. This process is inefficient and unnecessarily wastes power because the performance of PFR read 450 was not required.

For very high speed processor designs, bypass detection logic is critical for enhancing timing (speed). Using information that indicates there is a possible bypass to shut off reads from register files is often not possible because, in newer technologies, register file reads take longer to perform, and thus the process needs to be started earlier. Furthermore, bypass logic is complex, so the output of such the bypass logic cannot be used for shutting down the read power of register files.

SUMMARY OF EMBODIMENTS OF THE PRESENT INVENTION

A method and apparatus are described for reducing power consumption in a processor. A micro-operation is selected for execution, and a destination physical register tag of the selected micro-operation is compared to a plurality of source physical register tags of micro-operations dependent upon the selected micro-operation. If there is a match between the destination physical register tag and one of the source physical register tags, a corresponding physical register file (PRF) read operation is disabled. The comparison may be performed by a wakeup content-addressable memory (CAM) of a scheduler. The wakeup CAM may send a read control signal to the PRF to disable the read operation. Disabling the corresponding PRF read operation may include shutting off power in the PRF and related logic.

BRIEF DESCRIPTION OF THE DRAWINGS

A more detailed understanding may be had from the following description, given by way of example in conjunction with the accompanying drawings wherein.

DETAILED DESCRIPTION

Bypass detection may be may be performed by comparing two register file addresses in a bypass content-addressable memory (CAM). In one embodiment of the present invention, a micro-operation is selected for execution, a destination physical register tag of the selected micro-operation is compared to a plurality of source physical register tags of micro-operations dependent upon the selected micro-operation and, if there is a match between the destination physical register tag and one of the source physical register tags, a corresponding physical register file (PRF) read operation is disabled.

Figure 5:
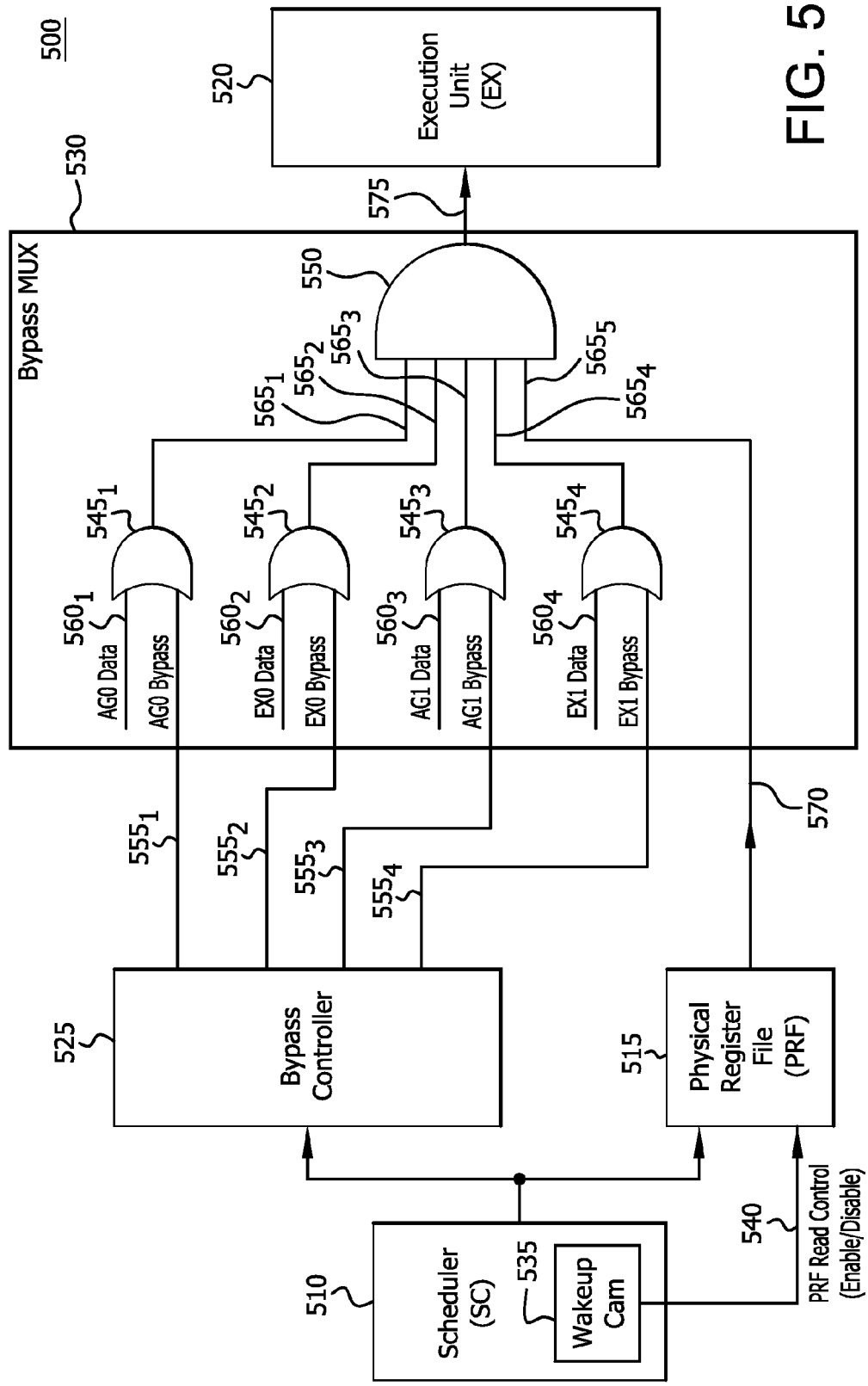
FIG. 5 shows details of a processor pipeline in accordance with an embodiment of the present invention.

FIG. 5 shows details of a processor pipeline 500 in accordance with an embodiment of the present invention. The processor pipeline 500 includes a scheduler (SC) 510, a PRF 515, an execution unit (EX) 520, a bypass controller 525 and a bypass MUX 530. The scheduler 510 outputs uOps to each of the PRF 515 and the bypass controller 525. The scheduler 510 includes a wakeup CAM 535 that is configured to output a PRF read control signal 540 that either enables or disables a PRF read operation performed in the PRF 515. The bypass MUX 530 includes a plurality of OR gates 545 and an AND gate 550. The bypass MUX 530 receives bypass signals 555 from the bypass controller 525, and data inputs 560 from the address generation pipelines AG0 and AG1, and the arithmetic logic pipelines EX0 and EX1. Each of the respective data inputs 560 are OR'd with respective bypass signals 555. The outputs 565 of the OR gates 545 and an output from the PRF 570 are combined by the AND gate 550, which sends its output 575 to the execution unit 520.

The PRF 515 is generally built as an array. For a read operation, the PRF 515 receives an address, such as a PRN, and a read command, (a "read enable"). The output of the PRF 515 is the data stored at the given address if the read enable is a logic high, or all logic ones if the read enable is a logic low. An internal implementation of the PRF 515 uses a decoder ranging from 7 bits (the PRN) to a full array size of 128 entries. Each output of the decoder is qualified by the read enable and is correlated to a wordline corresponding to the given address.

When the read enable is not asserted, none of the wordlines can go high. Thus, no power is discharged in the read operation. The read enable applies to one specific cycle only. Thus, if the read enable is deasserted in cycle N, the PRF 515 will not burn the power in cycle N. The read enable may be asserted again in cycle N+1 in case the read operation needs to be performed.

In general, the decoder is a piece of combinational logic; (an array of gates). In order to reduce the power consumed, one would need to make sure that the input address does not change when the read enable is deasserted. This may be performed based on the current match, (the output of the wakeup CAM), but the decoder power is usually negligible compared with the power spent in the actual array.

Figure 1:
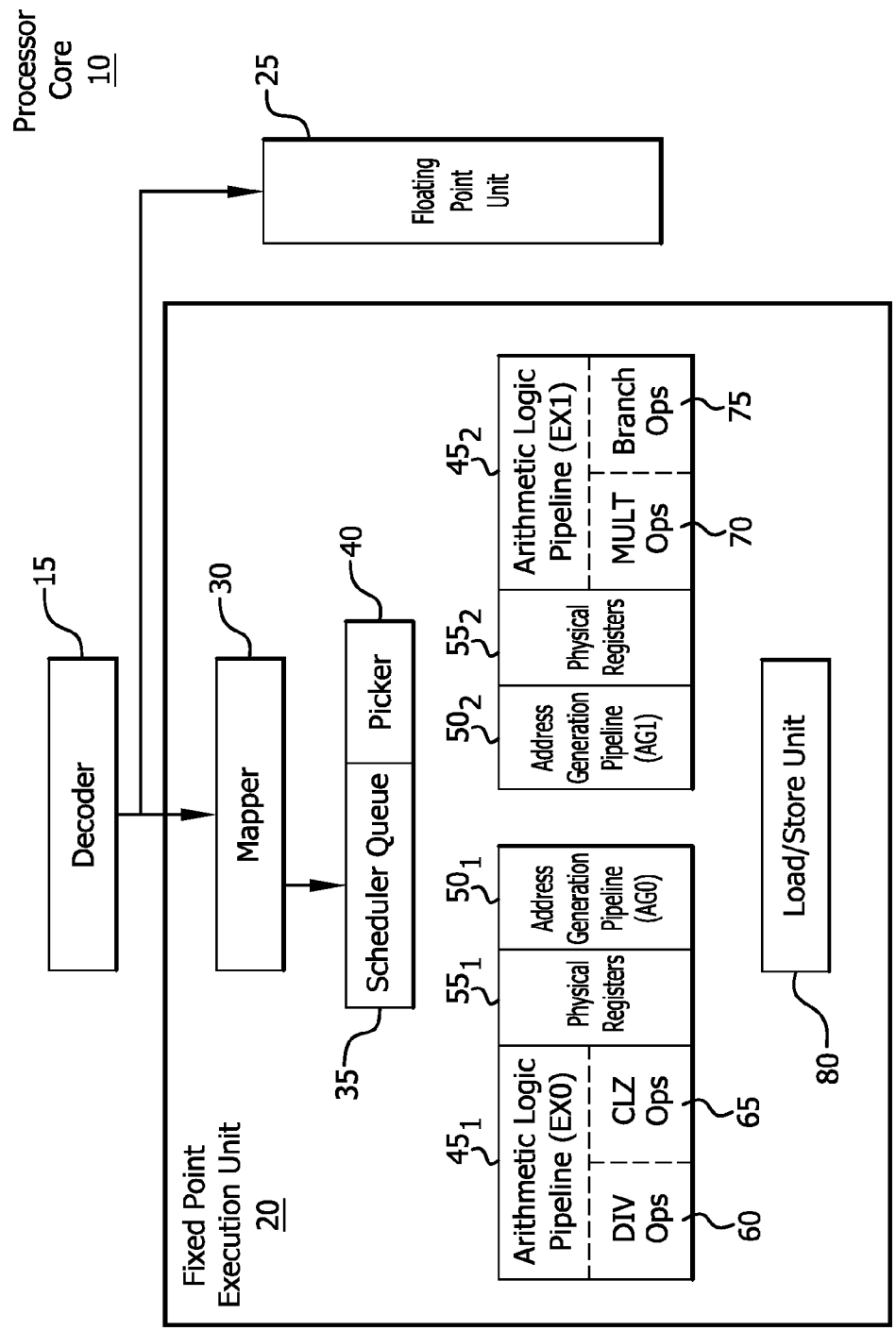
FIG. 1 shows a block diagram of an example conventional processor core of a multi-core IC.
Figure 2A:
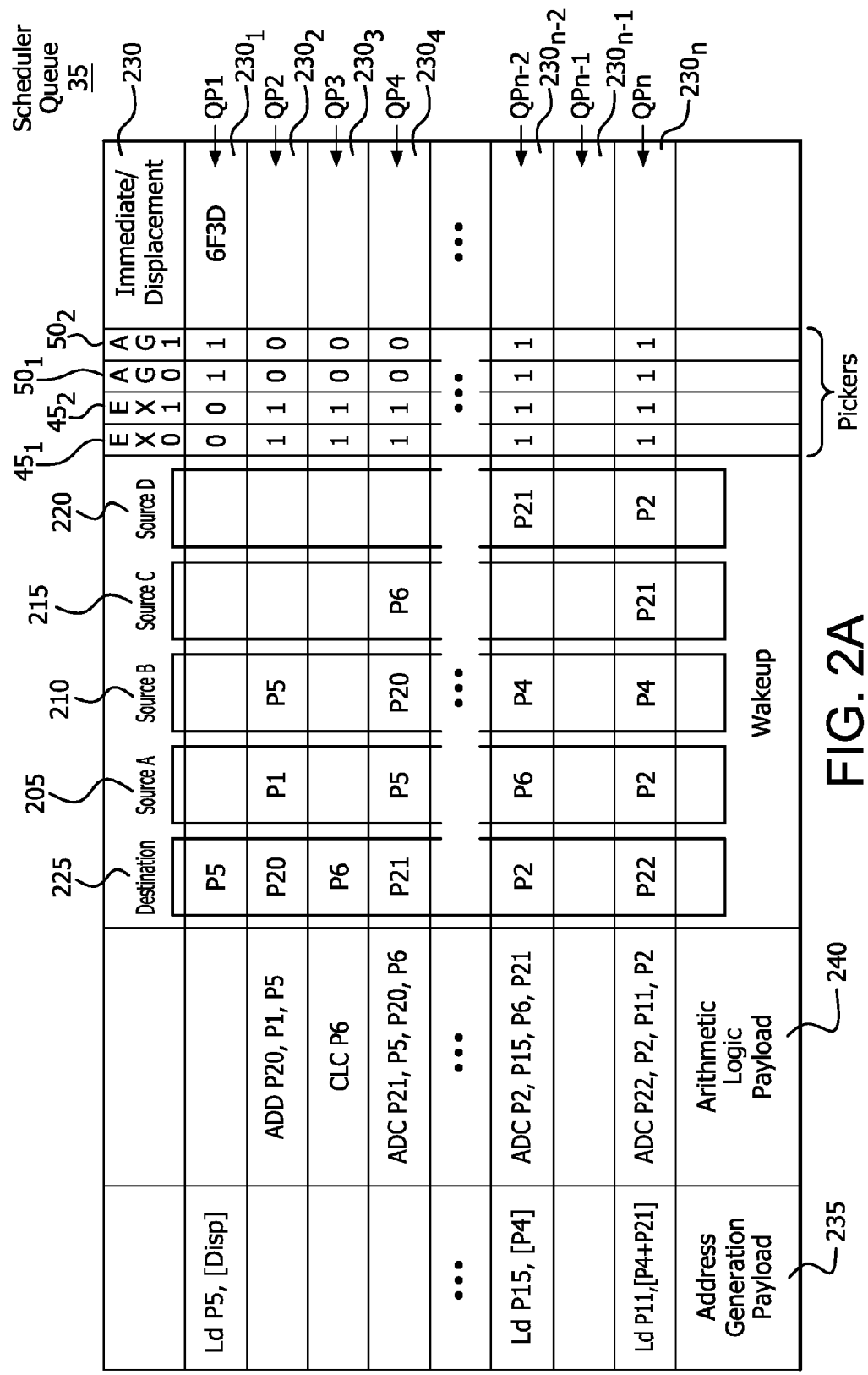
FIG. 2A shows a plurality of queue positions in a scheduler queue residing in the conventional processor core.
Figure 2B:
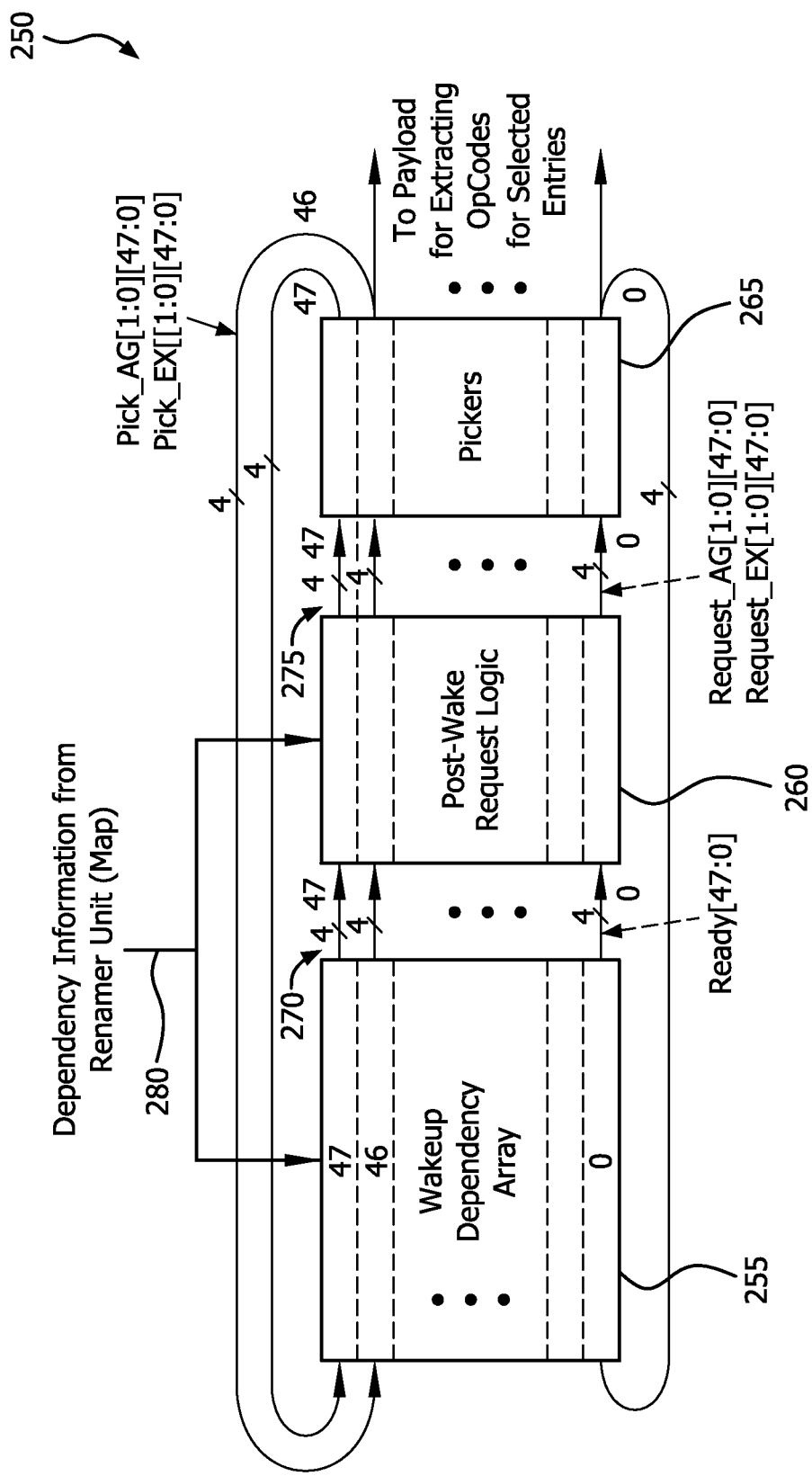
FIG. 2B shows the logical organization of a conventional picker.
Figure 3A:
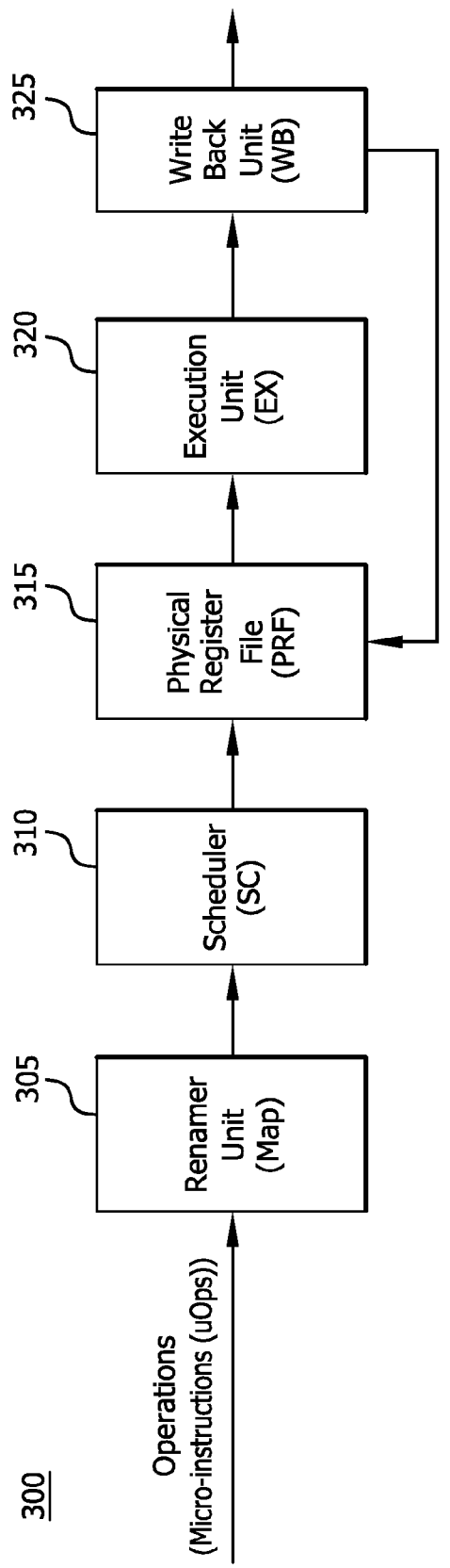
FIG. 3A shows a conventional processor pipeline.
Figure 3B:
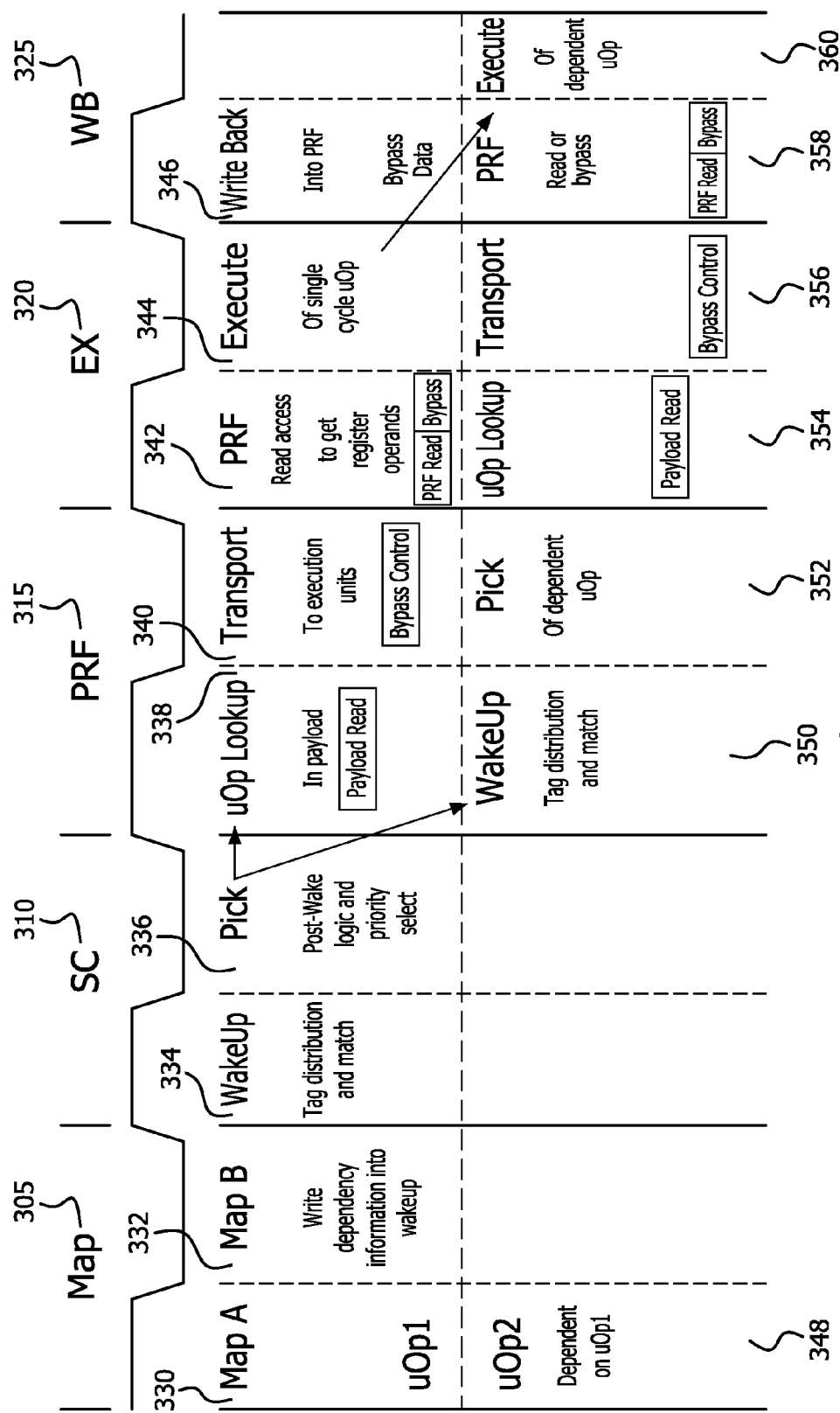
FIG. 3B shows how a typical single cycle uOp would be scheduled and executed in the conventional processor pipeline of FIG. 3A.
Figure 3C:
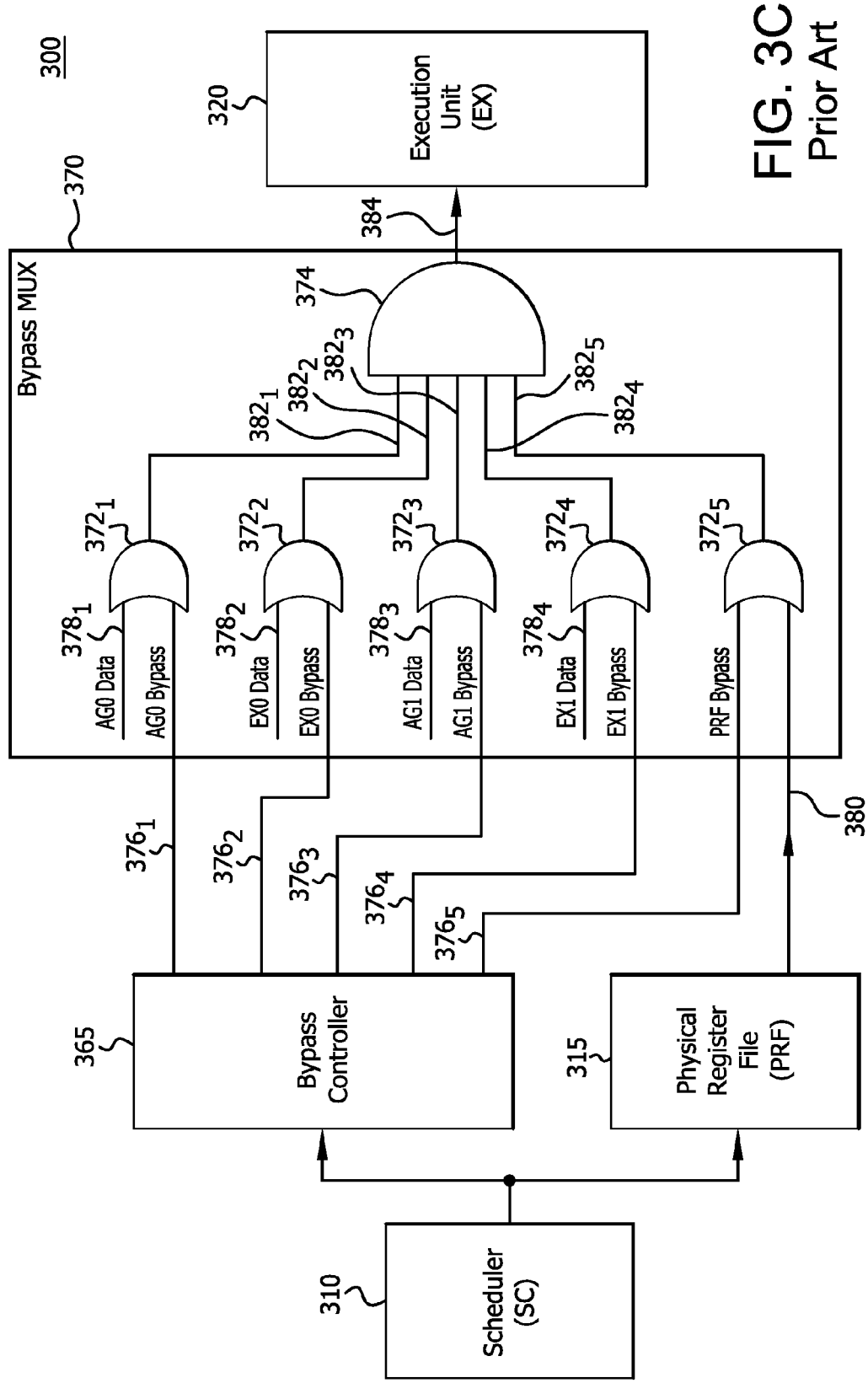
FIG. 3C shows details of the conventional processor pipeline of FIG. 3A.
Figure 4:
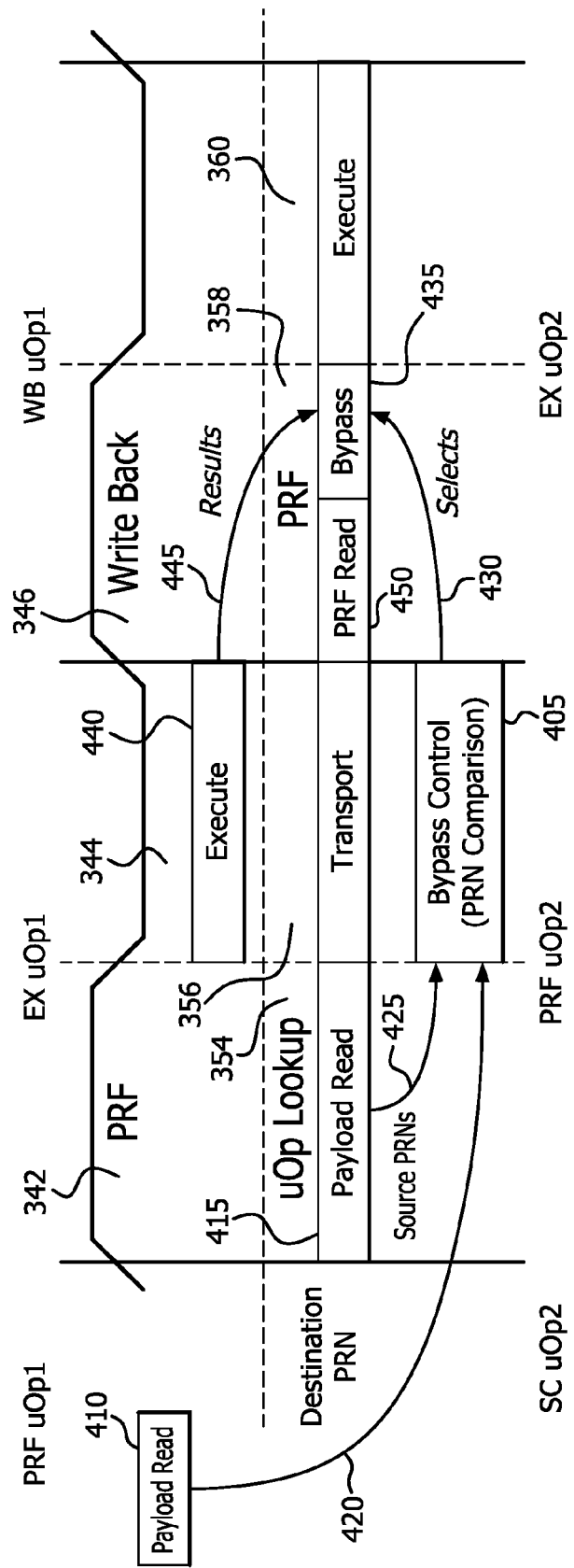
FIG. 4 shows a conventional PRF read operation and bypass operation.

In addition, if the PRF 515 outputs all logic ones when it is not in use, its output does not need a qualification gate, (such as the OR gate 3725 shown in FIG. 3C), before being combined with the bypass data. This saving is significant, since the PRF read data going through the bypass MUX 530 and into the execution unit 520 may be a critical path in the design.

Figure 6:
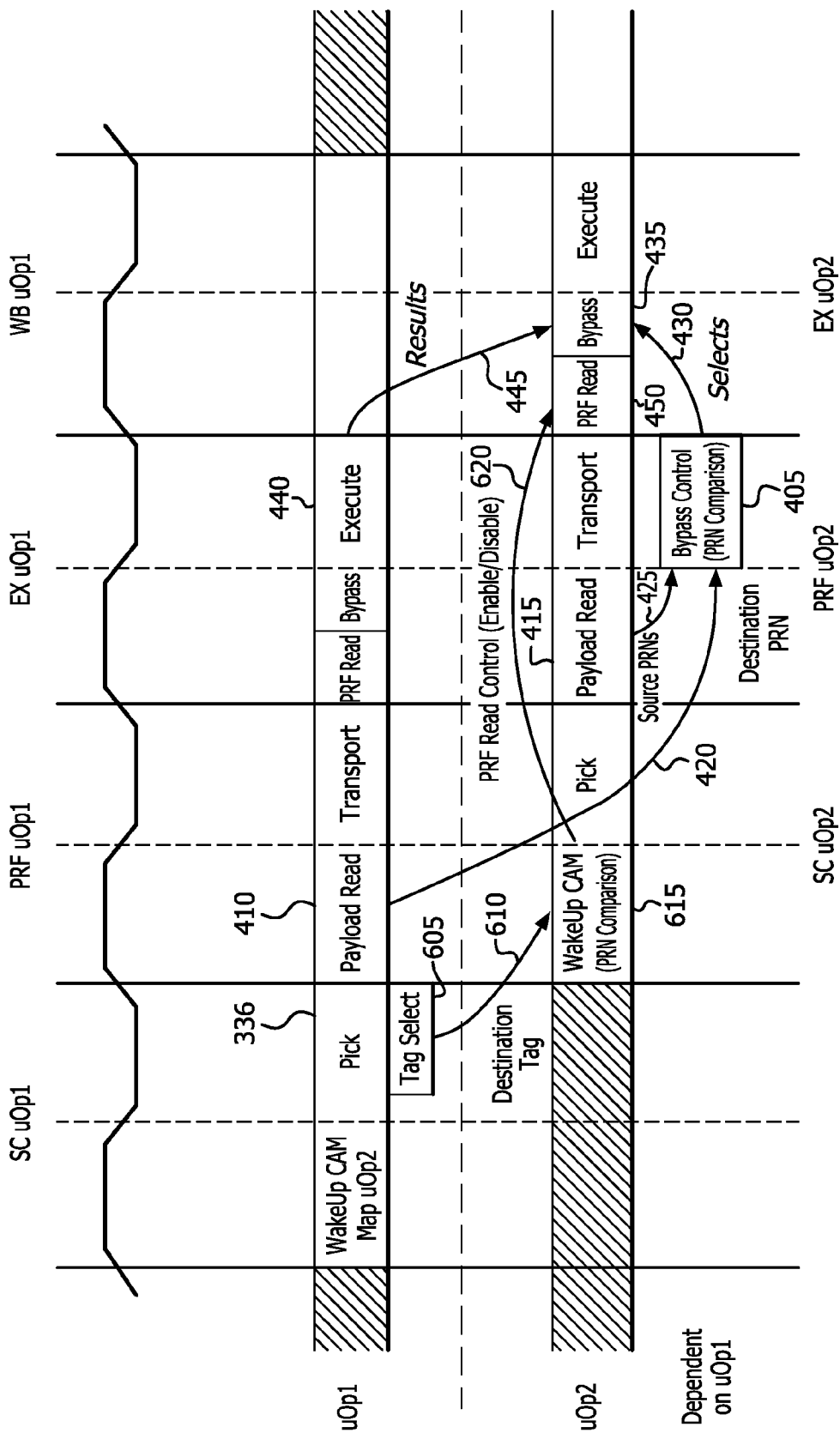
FIG. 6 shows a PRF read operation and bypass operation in accordance with an embodiment of the present invention.

FIG. 6 shows a PRF read operation and bypass operation in accordance with an embodiment of the present invention. As shown in FIG. 6, a first micro-operation (uOp1) is selected (i.e., picked) for execution, and a tag select operation 605 occurs whereby a destination PRN of the uOp1 is selected during cycle phase 336 of a scheduler, and a destination physical register tag 610 is sent (i.e., broadcasted) to a wakeup CAM 615. The wakeup CAM 615 compares the destination physical register tag 610 to source physical register tags in the wakeup CAM 615 that are dependent upon the selected micro-operation. If there is a match between the destination physical register tag 610 and one of the source physical register tags in the wakeup CAM 615, a signal 620 is sent to disable a PRF read operation.

Although features and elements are described above in particular combinations, each feature or element can be used alone without the other features and elements or in various combinations with or without other features and elements. The apparatus described herein may be manufactured using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

What is claimed is:

1. A method of selectively enabling or disabling a PRF read operation performed in a physical register file (PRF) in a processor to reduce power consumption, the method comprising:
providing, by a scheduler in the processor, a plurality of micro-operations to each of the PRF and a bypass controller;
selecting, by the scheduler in the processor, one of the plurality of micro-operations for execution;
comparing, by the scheduler in the processor, a selected destination physical register tag of the selected micro-operation to a plurality of source physical register tags of micro-operations each dependent upon the selected micro-operation; and
selectively asserting, by the scheduler, a read control signal to the PRF for selectively enabling and disabling the PRF read operation performed in the PRF, wherein the PRF outputs data to a bypass multiplexer when the PRF is enabled, and the PRF is disabled by deasserting the read control signal during a particular cycle responsive to a match between the destination physical register tag and one of the source physical register tags in the scheduler.

2. The method of claim 1 wherein disabling the PRF further comprises shutting off power in the PRF and related logic.

3. The method of claim 1 further comprising:
the PRF outputting data to an execution unit via a single logic gate in the bypass multiplexer.

4. The method of claim 3 wherein the logic gate is an AND gate.

5. The method of claim 1 wherein the PRF is disabled at least one cycle before performing a bypass control procedure.

6. The method of claim 1 wherein the scheduler comprises a content-addressable memory (CAM) configured to output the read control signal to the PRF.

7. The method of claim 1, further comprising:
providing, to the PRF by the scheduler, an address to a storage location having data;
outputting, by a decoder in the PRF, a plurality of output data;
qualifying each output of the decoder by the read control signal; and
correlating each output of the decoder to a wordline corresponding to the address.

8. A processor comprising:
a physical register file (PRF);
a bypass multiplexer;
a bypass controller; and
a scheduler configured to:
provide a plurality of micro-operations to each of the PRF and the bypass controller;
select one of the plurality of micro-operations for execution;
compare a destination physical register tag of a selected micro-operation to a plurality of source physical register tags of micro-operations dependent upon the selected micro-operation, and
selectively assert a read control signal to the PRF for selectively enabling and disabling a PRF read operation performed in the PRF, wherein the PRF outputs data to the bypass multiplexer when the PRF is enabled, and the PRF is disabled by deasserting the read control signal during a particular cycle responsive to a match between the destination physical register tag and one of the source physical register tags in the scheduler.

9. The processor of claim 8 wherein the scheduler comprises a content-addressable memory (CAM) configured to output the read control signal to the PRF.

10. The processor of claim 9 wherein the read control signal shuts off power in the PRF and related logic.

11. The processor of claim 8 wherein the bypass multiplexer enables the PRF to output data to an execution unit via a single logic gate.

12. The processor of claim 11 wherein the logic gate is an AND gate.

13. The processor of claim 8 wherein the PRF is disabled at least one cycle before performing a bypass control procedure.

14. A processor comprising:
a physical register file (PRF);
a bypass multiplexer;
a bypass controller; and
a scheduler having a content-addressable memory (CAM) configured to:
provide a plurality of micro-operations to each of the PRF and the bypass controller;
select one of the plurality of micro-operations for execution;
compare a destination physical register tag of a selected micro-operation to a plurality of source physical register tags of micro-operations dependent upon the selected micro-operation; and
selectively assert a read control signal to a PRF read operation performed in the PRF for selectively enabling and disabling the PRF, wherein the PRF outputs data to the bypass multiplexer when the PRF is enabled, and the PRF is disabled by deasserting the read control signal during a particular cycle responsive to a match between a destination physical register tag and one of a plurality of source physical register tags in the CAM.

15. The processor of claim 14 wherein the scheduler is further configured to select a micro-operation for execution, the destination physical register tag is associated with the selected micro-operation, and the source physical register tags are associated with micro-operations dependent upon the selected micro-operation.

16. The processor of claim 14 wherein the read control signal shuts off power in the PRF and related logic.

17. A non-transitory computer-readable storage medium having stored thereon a set of instructions used for manufacturing a semiconductor device, wherein the semiconductor device comprises:
a physical register file (PRF);
a bypass multiplexer;
a bypass controller; and
a scheduler; wherein, the instructions when executed cause the scheduler to perform a method for enabling and disabling a PRF operation, the method comprising:
providing a plurality of micro-operations to each of the PRF and the bypass controller;
selecting one of the plurality of micro-operations for execution;
comparing a selected destination physical register tag of the selected micro-operation to a plurality of source physical register tags of micro-operations dependent upon the selected micro-operation, and
selectively asserting a read control signal to a PRF read operation performed in the PRF for selectively enabling and disabling the PRF, wherein the PRF outputs data to the bypass multiplexer when the PRF is enabled, and the PRF is disabled by deasserting the read control signal during a particular cycle responsive to a match between the destination physical register tag and one of the source physical register tags in the scheduler.

18. The non-transitory computer-readable storage medium of claim 17 wherein the instructions are Verilog data instructions.

19. The non-transitory computer-readable storage medium of claim 17 wherein the instructions are hardware description language (HDL) instructions.

20. The non-transitory computer-readable storage medium of claim 17 wherein the scheduler comprises a content-addressable memory (CAM) configured to output the read control signal to the PRF.

21. The non-transitory computer-readable storage medium of claim 17 wherein the bypass multiplexer enables the PRF to output data to an execution unit via a single logic gate in the bypass multiplexer.

* * * * *